Patented Jan. 29, 1946

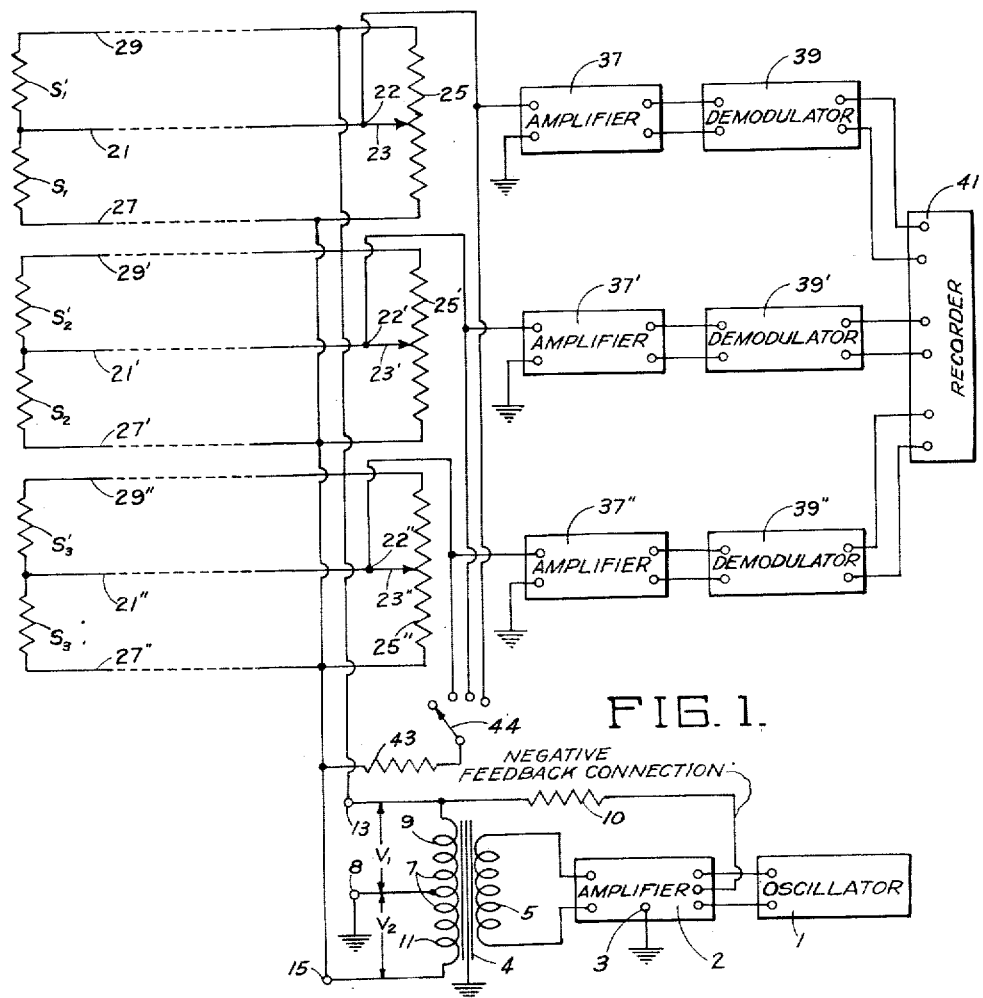
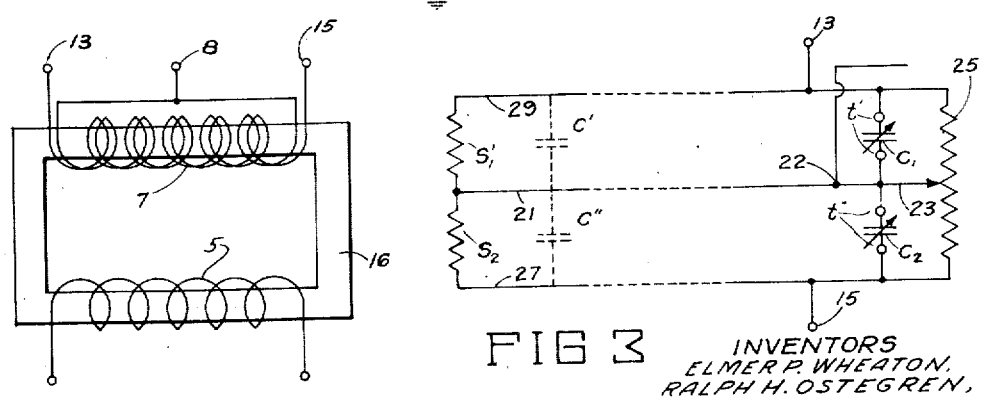

2,393,669

UNITED STATES PATENT OFFICE 2,393,669

STRAIN MEASURING SYSTEM

Elmer P. Wheaton, Los Angeles, and Ralph H. Ostergren, Santa Monica, Calif., assignors to Consolidated Engineering Corporation, Pasadena, Calif., a corporation of California Application October 21, 1941, Serial No. 415,906

15 Claims. (Cl. 73—88)

This invention relates to the measurement of strain or displacements and has particular reference to a system in which a carrier wave is modulated in accordance with strain or displacements.

The strain produced in a member of a mechanical body as a result of a change in condition of the body may be determined by securing the ends of a variable impedance between two points of the member, and measuring changes in the impedance resulting from changes in the strain of the body. Such variable impedances are known as strain gauges. Such strain gauges are commonly placed at a plurality of points of a body under investigation, and records or measurements of changes in strain at these points are simultaneously made.

Static strains due to a change in condition may be measured by comparing the value of such an impedance before and after the condition of the body is changed. Dynamic strain measurement may be made by measuring or recording in a suitable manner the variations in impedance as a function of time. Basically, any such a strain measuring system measures the relative displacement occurring between points in the body as a result of a change in condition.

In the operation of variable impedance strain measuring devices, the range of variation of impedance is maintained small, say less than one or two percent, so that the changes in impedance will be substantially proportional to the changes in strain or displacement being measured.

In order to facilitate strain measurement of the aforementioned type, we modulate a carrier wave in proportion to the impedance changes and hence in proportion to the changes in strain. In order to accomplish this result, we generate a reference carrier wave having a reference or fixed phase, and also a second carrier wave, change the amplitude of the second carrier wave in proportion to a change in impedance in response to a displacement change while maintaining the changing portion of the second carrier wave in phase with the reference carrier wave, and thereupon produce a carrier wave modulated in accordance with the variation in strain by reproducing the difference between said two voltages.

In one of the simplest forms of our invention, we utilize a bridge circuit having two branch circuits connected across the input terminals, one branch circuit comprising two arms respectively formed by two closely coupled inductances which are preferably sections of a carrier oscillator output transformer secondary and the other branch circuit comprising two resistance arms, one of which may be fixed and the other of which may include a resistance strain gauge. In applying our system to the measurement of strain at a plurality of points of a body under investigation we utilize a plurality of such bridges in which said transformer secondary comprises a common branch circuit. The output of each bridge is taken between one common terminal which separates the two sections of said transformer secondary, and an individual output terminal which separates the two resistance arms of each individual bridge branch circuit.

When a carrier is applied across the common input terminals of said bridges, the amount of unbalance of each bridge varies independently, so that there appears in the output of each bridge a carrier wave in which the degree of modulation is proportional to the strain at the points where the respective strain gauges are mounted. In making static strain measurements, a change in the degree of modulation from one condition of the body member to another condition is measured. In making dynamic strain measurements, the modulated carrier is preferably demodulated and a record made of the envelope wave with or without intermediate integration of the envelope according to the type of pickup producing the modulation and according to the dynamic characteristic under investigation.

Prior to our invention resistance type strain gauges have been used in D. C. bridge circuit only. By utilizing variations in the strain of such a gauge to modulate a carrier we are able to provide a flexible system which is readily adapted to amplification and we are able to eliminate the undesired thermoelectric effects often encountered in such D. C. systems.

Inasmuch as the displacement between two points of a body under investigation may be calibrated in terms of either strain or stress, it is to be understood that we consider strain measurement and stress measurement different forms of displacement measurement. A strain is a fractional change of displacement between two points of a mechanical member, such fractional change being proportional to the change in applied stress as long as the member does not exceed its elastic limit. It is also to be understood that the impedance of an electrical element may be varied in response to displacement changes between points on different bodies or different members of the same body, and that our invention is equally applicable to this type of displacement measurement. Such displacement changes may reflect a vibratory condition of the body and be taken as a measure thereof.

The principal object of our invention is to provide a system for modulating a carrier wave in proportion to the strain or displacement changes in a mechanical body under test.

Another object of our invention is to provide a simple circuit, using a common carrier supply, for producing a plurality of carrier waves, each of which is independently modulated in accordance with changes in strain at various points of a body under investigation.

Still another object is to provide means for calibrating a variable impedance strain measuring system.

And still another object is to prevent cross modulation between carrier bridge circuits having a common branch.

Another object is to provide a system for compensating for stray capacitances between cable leads used in bridges having strain gauges at remote points.

Our invention possesses numerous other objects and features of advantage, some of which, together with the foregoing, will be set forth in the following description of specific apparatus embodying and utilizing my novel method. It is therefore to be understood that our method is applicable to other apparatus, and that we do not limit ourselves, in any way to the apparatus, of the present application, as we may adopt various other apparatus embodiments, utilizing the method, within the scope of the appended claims.

In the drawing:

Fig. 1 is a schematic diagram of a multichannel strain measuring system, incorporating our invention.

Fig. 2 is a schematic diagram of a preferred form of transformer used in our system.

Fig. 3 is a wiring diagram of a form of our system utilizing long cables.

Referring to Fig. 1, a carrier wave voltage of high frequency compared to the frequency of any displacement changes or vibrations which it is desired to measure, is generated in a regulated carrier voltage supply or oscillator 1, and amplified by an amplifier 2 grounded at a convenient point 3 and having an output transformer 4 with a primary 5 and a split secondary 7, said secondary 7 has a grounded center tap 8 separating the two parts of the secondary, which parts comprise two closely coupled inductances 9 and 11. The amplified output of oscillator 1 appearing across the ends of said secondary 7 is applied across the two bridge input terminals 13 and 15. A negative feedback connection including a feedback resistor 10 is connected from one end of said transformer to the amplifier 2 input.

The inductances of the two halves of said secondary are preferably, though not necessarily, equal. However, in any case, the two inductances are closely coupled so that there is zero phase difference between the voltage $V_1$ appearing across inductance 9, between terminal 13 and grounded center tap 8, and voltage $V_2$ appearing across inductance 11, between terminal 15 and grounded center tap 8, and there is a constant ratio of voltage $V_1$ to voltage $V_2$.

In one preferred form of our invention, we utilize a transformer constructed in the manner indicated in Fig. 2. As illustrated here the primary 5 and the secondary 7 are bifilar wound on a common, closed, laminated, core 16 of a low permeability material such as soft iron. The two halves of the secondary are bifilar wound so as to reduce leakage reactance to practically zero, thus providing substantially 100 per cent mutual coupling between the two inductances 9 and 11 represented by the respective windings. With such a transformer, the voltages $V_1$ and $V_2$ across the two halves of the secondary always remain in phase, and in a constant ratio, even though the load across the inductances may differ or may vary. The reason for preferring to use a secondary having two such closely coupled inductances will become apparent hereinafter. If said inductances are not bifilar wound, close coupling and low leakage reactance between them can be obtained by designing the magnetic circuit to operate at a flux density less than about one-half to one-third of the saturating flux density of the transformer core. Said two inductances may be parts of a center-tapped choke to which the carrier is directly applied from the amplifier output by any suitable means.

In order to measure the strain at a point in a structural member of a body under investigation, a variable resistance strain gauge $S_1$ may be attached to said member at said point in a suitable manner. Simple variable resistance strain gauges are available which may be cemented to said member over a small area at a point under investigation. When the member is strained the resistance of the strain gauge varies in a corresponding degree and may be measured in a suitable manner. Such resistance type strain gauges may comprise a resistor in the form of a wire, the length of which changes in proportion to the strain, or may comprise a carbon pile in which the pressure between successive carbon elements varies in accordance with the strain, or it may comprise an elongated plastic strip of material containing intermingled carbon and silica particles held together by a resilient binder, the stress in which varies in accordance with the strain. Each of these three types of strain measuring devices is a resistor, the resistance of which is varied in response to the strain of a body to which the resistor is suitably attached. Such variable resistance strain gauges and their manner of application, are well known in the art, and need not be described in detail here.

An auxiliary or "dummy" strain gauge, $S_1'$, similar to strain gauge $S_1$ is connected in series therewith. The junction between said two strain gauges $S_1$ and $S_1'$ is connected by means of a cable lead 21, to a terminal 22 connected to a sliding contact 23 of a potentiometer 25. The other terminals of said two series-connected strain gauges $S_1$ and $S_1'$ are connected through cable leads 27 and 29 across said potentiometer 25 and across bridge input terminals 13 and 15. In effect this circuit is a Wheatstone bridge, wherein one branch circuit includes the two tightly coupled inductances 9 and 11, and the other branch circuit includes the strain gauges $S_1$ and $S_1'$ and potentiometer 25. The output of this bridge appears across terminals 8 and 22. Potentiometer 25 has a resistance which is very large compared to the strain gauge resistance and is adjustable over such a range as not to appreciably affect the impedance of the bridge arms which include said strain gauges.

A second set of strain gauges $S_2$ and $S_2'$ are similarly connected in series to a potentiometer 25' through cable leads 21', 27', and 29' and to transformer 4. A third set of strain gauges $S_3$ and $S_3'$ are also similarly connected in series to a potentiometer 25'' through cable leads 21'', 27'', and 29'' and to transformer 4. In effect then, we have three Wheatstone bridges having common input terminals 13 and 15 with a common branch comprising said two closely coupled inductances 9 and 11, and separate branches including displacement responsive strain gauges $S_1$, $S_2$ and $S_3$ respectively. Each potentiometer 25, 25', and 25" may be adjusted to a point off balance to a small degree, so that a small off balance voltage appears at the output of each bridge in phase with the voltages $V_1$ and $V_2$ across the inductances 9 and 11. The current through the resistance arms and the resistance strain gauges of each bridge is substantially in phase with the voltages $V_1$ and $V_2$. The carrier wave appearing at the output of each bridge is applied to amplifiers 37, 37', and 37" respectively, preferably having high input impedances compared to the impedances of the bridges as measured across their output terminals. The electrical outputs of said amplifiers are in turn demodulated by demodulators 39, 39', and 39" respectively, which are connected to separate galvanometers of the multi-element oscillograph 41.

The impedances of said strain gauges is preferably large compared to the impedances of the arms in the common bridge branch circuit. In practice due to the negative feedback connection of amplifier 2, the impedance of said branch circuit is only a few ohms, while the impedance of said strain gauges may be about one hundred ohms or more.

When the resistances of the three strain gauges $S_1$, $S_2$, and $S_3$ vary in response to strain produced in the bodies to which they are attached, the degree of unbalance of the respective bridges varies, so that the carrier appearing across the output of each of the respective bridges is modulated in accordance with the strain detected by said strain gauges.

Under dynamic conditions the envelope or modulation component of the modulated carrier appearing in each bridge output circuit represents the varying strain or vibration at the point of application of the corresponding strain gauge to the body under investigation. Each envelope or demodulation component may be observed or measured in any suitable manner such as by means of a cathode ray oscillograph but is preferably recorded as an oscillograph trace by recorder 41.

If an auxiliary strain gauge such as $S_1'$ is positioned adjacent the corresponding strain gauge $S_1$ without being cemented to the member, any variations in temperature at the point under investigation will effect both strain gauges substantially equally and reduce to a minimum any errors due to temperature fluctuations. If it is desired to measure the difference in strains occurring at two points of a body under investigation, the two strain gauges $S_1$ and $S_1'$ connected in arms of the same bridge may be mounted at the respective points. In order to measure the flexure of a flexible member such as a beam, strip, or plate, said two strain gauges $S_1$ and $S_1'$ may be cemented on opposite sides thereof, so that one gauge is subjected to tension and the other to compression as the member is flexed and the changes in the two gauges cooperate to produce twice as much change in bridge unbalance as is obtained when only one of the gauges is applied to said member. In either case changes in output of said bridge due to a change in the condition of body under investigation is a measure of the difference in strains detected by said two strain gauges $S_1$ and $S_1'$.

To calibrate the bridges we utilize a resistance 43 which is permanently connected to input terminal 15 and may be connected in parallel with strain gauge $S_1$, $S_2$, $S_3$ alternately by proper connection through rotary switch 44. When resistance 43 is connected in parallel with one of the strain gauges $S_1$ and $S_2$, the total resistance of these parallel connected resistances is changed by a predetermined small amount of about one tenth of one percent of the strain gauge resistance. This affects a change in carrier amplitude which may be measured and which serves as an index to the amount of strain corresponding to said resistance change. In case the various oscillograph traces should get out of their normal order on the record produced by said recorder 41, a trace corresponding to a particular channel may be located on the record by connecting said resistance 43 momentarily in that channel and observing the trace in which a corresponding impulse occurs.

Cross modulation between the three bridges is reduced to a minimum first by making the input impedances of the three amplifiers as high as possible compared to the circuits connected thereto, second by making the coupling between said two inductances 9 and 11 as close as possible, and third by using said negative feedback connection of amplifier 2. All three of these factors cooperate to make the voltage across both inductances 9 and 11 very nearly constant regardless of changes in the impedance value of the loads connected thereacross.

Due to the close coupling between said two inductances, the voltages thereacross are maintained in phase with each other even though there may be some unbalance in the loads across terminals 13 and 15 to ground. By so maintaining the voltages $V_1$ and $V_2$, in phase with each other, the degree of modulation of the carrier appearing in the output of each bridge is also in the same phase and proportional to the change in resistance of each of the respective strain gauges. The degree of modulation of the carrier appearing in each bridge output is proportional to the resistance change, because the change in voltage across the bridge output is in phase with the carrier initially appearing there.

When the cables connecting the strain gauges to the remainder of the bridge circuits are so long as to introduce troublesome stray capacitances between the lines, we balance out these stray capacitances to achieve the desired linearity. Such a system is shown in Fig. 3 which represents one of the channels of Fig. 1, except that the outside cable leads 27, and 29 have appreciable strap capacitances $C'$, and $C''$ respectively with respect to the central lead 21. The effects of such capacitances is to produce out of phase currents through the strain gauges $S_1$ and $S_1'$ and the two parts of potentiometer 25 connected in parallel therewith, the effect of which is to destroy the proportionality of changes in bridge circuit output voltage to changes in strain gauge resistance.

We have found that if two reactive impedances in the form of condensers $C_1$ and $C_2$ respectively connected to plug-in terminals $t'$ and $t''$ across the two parts of potentiometer 25 which are in parallel with the strain gauges, are properly adjusted the desired proportionality may be restored. In operating this system the bridge output is reduced to a minimum value by adjustment of the slide wire 23 and said capacitances $C_1$ and $C_2$ and then the potentiometer slide wire is adjusted to a point off balance so as to produce a small carrier voltage of suitable magnitude across the bridge output. It is understood of course that a condenser is necessary across only one bridge arm to affect proper balance as long as it is connected in the proper arm.

Though we have described our invention as applied to three strain measuring channels having certain common elements, we have actually applied our invention to a system utilizing as many as twelve such channels, and it is to be understood that even more could be used.

In measuring the strain of a body with such a strain gauge, such as $S_1$, $S_2$, and $S_3$, the gauge is attached to the body in one condition, either strained or unstrained, the condition of the body changed, and the resultant strain, or change of strain, measured. In either case a change in displacement of different points as a result of changing the condition of the body is measured. If the body is in a vibratory condition, the changes in strain or displacement may be measured or recorded as a function of time to study the vibrations.

While we have described our invention with particular reference to the measurement of strain with variable resistance strain gauges, it is to be understood that with suitable modification our invention is also applicable to systems wherein the strain gauges are replaced by other variable impedance devices which are responsive to changes in displacement.

From the foregoing description it is seen that we have provided a simple strain responsive bridge circuit and a simple system for supplying a common carrier to a plurality of bridge circuits which act to produce a plurality of modulated carrier waves in which the degree of modulation is proportional to changes in strain or displacement which it is desired to measure.

We claim:

1. In a carrier modulation system for measurement of changes in displacement utilizing a plurality of bridges having common carrier input terminals, a branch circuit common to the bridges connected across the input terminals, an output terminal in said circuit between two arms thereof common to the bridges, a separate branch circuit for each bridge connected across said carrier input terminals and having intermediate the ends thereof a separate output terminal for each bridge, a variable impedance adapted for mounting at a different point of a body member connected and arranged in each separate branch circuit to change the unbalance of the corresponding bridge by an amount varying with a displacement of the body member at such point, means to apply a carrier voltage across said common branch in such a manner as to maintain a zero phase angle between the portions of carrier voltage across the arms of said common branch regardless of changes in the impedances of said separate branch circuits, and means connected between the common output terminal and the separate output terminal of each bridge for indicating the degree of unbalance of the bridge.

2. In a carrier modulation system for measurement of changes in displacement utilizing a plurality of bridges having common carrier input terminals, a branch circuit common to the bridges connected across the input terminals, an output terminal in said circuit between two arms thereof common to said bridges, said two arms comprising two corresponding inductances mutually coupled magnetically, a separate branch circuit for each bridge connected across said carrier input terminals and having intermediate thereof a separate output terminal for each bridge, a variable impedance adapted for mounting at a different point of a body member connected in each separate branch circuit to change the unbalance of the corresponding bridge by an amount varying with a displacement of such point, a common carrier supply connected to apply a carrier voltage across the common input terminals, and means connected between the common output terminal and the separate output terminal of each bridge for indicating the degree of unbalance of the bridge.

3. A system as in claim 2, wherein said coupled inductances comprise two coils which are bifilar wound on a closed core made of low permeability material.

4. In a carrier modulation system for measurement of displacement utilizing a plurality of bridges having common carrier input terminals, a branch circuit common to the bridges connected across said input terminals, an output terminal in said common branch circuit between two arms thereof common to the bridges, said two arms comprising two corresponding inductances mutually coupled magnetically, a separate branch circuit for each bridge connected across said carrier input terminals and having intermediate the ends thereof a separate output terminal for each bridge, a variable resistance adapted for mounting at a different point of a body member connected and arranged in each separate branch circuit to change the unbalance of the corresponding bridge by an amount varying with the displacement of the body member at such point, a common carrier supply connected to apply a carrier voltage across said common input terminals, and means connected between the common output terminal and the separate output terminal of each bridge for indicating the degree of unbalance of the bridge.

5. In a carrier modulation system for measurement of vibration utilizing a plurality of bridges having common carrier input terminals, a branch circuit common to the bridges connected across the input terminals, an output terminal in said circuit between two arms thereof common to the bridges, said two arms comprising two corresponding inductances mutually coupled magnetically, a separate branch circuit for each bridge connected across said carrier input terminals and having intermediate the ends thereof a separate output terminal for each bridge, a variable impedance adapted for mounting at a different point of a body member connected and arranged in each separate branch circuit to change the unbalance of the corresponding bridge by an amount varying in accordance with the vibration of the body at such point, a common carrier supply connected to said common input terminals, and means connected between the common output terminal and the separate output terminal of each bridge for indicating the degree of unbalance of the bridge.

6. In a carrier modulation system for measurement of changes in displacement utilizing a plurality of bridges having common carrier input terminals, a branch circuit common to the bridges connected across the input terminals, an output terminal in said circuit between two arms thereof common to the bridges, a separate branch circuit for each bridge connected across said carrier input terminals and having intermediate the ends thereof a separate output terminal for each bridge, a variable impedance adapted for mounting at a different point of a body member connected and arranged in each separate branch circuit to vary the bridge unbalance by an amount varying with the displacement, a carrier oscillator, an amplifier connected thereto, means in the amplifier output to apply a carrier voltage across said common branch in such a manner as to maintain a constant ratio between the portions of carrier voltage across the arms of said common branch regardless of changes in the impedances of said separate branch circuits, a negative feedback connection to feedback a portion of said carrier voltage to said amplifier input, and means connected between the common output terminal and the separate output terminal for each bridge for indicating the degree of unbalance of the bridge.

7. In a carrier modulation system for measurement of changes in displacement utilizing a plurality of bridges having common carrier input terminals, a branch circuit common to the bridges connected across the input terminals, an output terminal in said circuit between two arms thereof common to said bridges, said two arms comprising mutually coupled inductances, a separate branch circuit for each bridge connected across said carrier input terminals and having intermediate the ends thereof a separate output terminal for each bridge, a variable impedance device in each separate branch circuit responsive to changes in displacement, an amplifier having its input adapted for connection to a carrier oscillator and having its output connected to said common branch, a negative feedback connection from a portion of said common branch to said amplifier input and means connected between the common output terminal and the separate output terminal of each bridge for indicating the degree of unbalance of the bridge.

8. In a multi-channel carrier modulation system for measurement of displacement changes, a plurality of unbalanced bridge circuits, each of said circuits having input terminals adapted for connection to a common carrier supply and output terminals adapted for connection to means for reproducing variations in the degree of bridge unbalance, a variable impedance, attachable at a different point of a body member, included in an arm of each of said circuits, to vary the degree of its associated bridge output unbalance in response to a displacement of the body member at the point of its location on said body member, a calibrating impedance, and switching means for selectively adding said calibrating impedance to an arm of any one of said bridge circuits to calibrate the bridge unbalancing effect which any of said variable impedances will have when exposed to a displacement change.

9. In apparatus for measuring displacements of a body member, an impedance attachable to said member and variable in accordance with the amplitude of displacement of the member, a source of carrier frequency electrical energy, means connected to the source for generating a carrier voltage of reference phase, means leading from said reference phase carrier voltage generating means for passing through said impedance a carrier frequency current, means for maintaining the carrier frequency in said impedance of such fixed phase relative to said reference phase that changes in value of the impedance in response to changes in displacement amplitude produce carrier frequency voltage changes across the impedance in phase with said carrier voltage, and means for indicating such voltage changes.

10. In carrier frequency apparatus for measuring strain, a first resistor attachable to a body member and variable in response to changes in the strain of said member, a second resistor in series with the first resistor, a source of carrier frequency electrical energy, means connected to the source for generating a reference carrier frequency voltage of reference phase, means leading from said reference phase carrier voltage generating means for passing through said resistors a carrier frequency current of the same phase as the carrier frequency voltage, means for maintaining the phase of the carrier frequency in said resistors the same as the phase of said carrier frequency voltage during variations in the resistance of the first resistor, whereby the voltage across said first resistor changes in response to changes in the strain of said member, means for reproducing the difference between the reference voltage and the voltage across the first resistor to produce a carrier wave modulated in accordance with variations in strain, and means for indicating changes in the degree of the modulation.

11. In a carrier modulation system for measurement of strain changes, a bridge circuit comprising two branch circuits connected in parallel across a pair of input terminals, one branch circuit comprising two arms formed by two corresponding inductances closely coupled magnetically with one output terminal between them, the other branch circuit comprising two arms with another output terminal therebetween, one arm of this branch circuit comprising a variable resistance adapted for mounting on a body member to change the bridge output by an amount varying with the strain in said member and thereby modulate the carrier, means for applying a carrier to the input terminals, and means connected to the output terminals for indicating changes in the degree of carrier modulation.

12. In a carrier modulation system for measurement of strain changes, a bridge circuit comprising two branch circuits connected in parallel across a pair of input terminals, one branch circuit comprising two arms formed by two corresponding inductances closely coupled magnetically with one output terminal between them, the other branch circuit comprising two arms with another output terminal therebetween, one arm of this branch circuit comprising a variable resistance adapted for mounting on a body member to change the bridge output by an amount varying with the strain in said member and thereby modulate the carrier, means for applying a carrier to the input terminals, and adjustable means so connected and arranged in the second branch as to control the mean amplitude of the carrier output independently of changes in strain, and means connected to the output terminals for indicating changes in the degree of carrier modulation.

13. In a carrier modulation system for measuring changes in a variable characteristic of a body, a plurality of bridge circuits, each bridge circuit comprising a common branch and a separate branch connected in parallel between a pair of common input terminals, the branch common to all the bridge circuits comprising two arms formed by two corresponding inductances closely coupled magnetically and connected at a common output terminal, the separate branch of each bridge comprising two arms one of which comprises an impedance attachable to a portion of such body and variable in accordance with variations in such characteristic thereof, an oscillator connected to apply a voltage of carrier frequency across the common input terminals, and means connected between the common output terminal and the separate output terminal of each bridge circuit for indicating the degree of unbalance of each of said bridge circuits.

14. In combination, an alternating current bridge circuit having a pair of input terminals, a pair of series-arranged impedances connected to said input terminals and including an output connection between them, a second pair of series-arranged impedances connected to said input terminals and having an output connection between them, a third pair of series-arranged impedances, normally in balance with said first pair, connected in parallel with said second pair and having a connection to the output terminal thereof from a point intermediate the impedances of said third pair, one of the impedances of said third pair being variable when stressed; a source of carrier frequency voltage; means for applying to said input terminals carrier frequency voltage derived from said source; and means for altering the relative values of the impedances in said second pair to produce a carrier voltage of desired and uniform amplitude across said output connections in the absence of applied stress to said variable impedance.

15. In combination, an alternating current bridge circuit having a pair of input terminals, a pair of series-arranged impedances connected to said input terminals and including an output connection between them, a second pair of series-arranged impedances connected to said input terminals and having an output connection between them, a third pair of series-arranged impedances, normally in balance with said first pair, connected in parallel by relatively long leads with said second pair and having a relative long lead connection to the output terminal thereof from a point intermediate the impedances of said third pair, one of the impedances of said third pair being variable when stressed; a source of carrier frequency voltage, means for applying to said input terminals carrier frequency voltage derived from said source; and means for compensating for any unbalance of said bridge circuit attributable to spray capacities between said relatively long connecting leads.

ELMER P. WHEATON.
RALPH H. OSTERGREN.

Certificate of Correction

Patent No. 2,393,669. January 29, 1946.

ELMER P. WHEATON ET AL.

It is hereby certified that errors appear in the printed specification of the above numbered patent requiring correction as follows: Page 3, second column, line 57, for "strap" read *stray*; page 6, second column, line 21, claim 15, for "spray" read *stray*; and that the said Letters Patent should be read with these corrections therein that the same may conform to the record of the case in the Patent Office.

Signed and sealed this 13th day of August, A. D. 1946.

[SEAL]

LESLIE FRAZER,
*First Assistant Commissioner of Patents.* frequency across the common input terminals, and means connected between the common output terminal and the separate output terminal of each bridge circuit for indicating the degree of unbalance of each of said bridge circuits.

14. In combination, an alternating current bridge circuit having a pair of input terminals, a pair of series-arranged impedances connected to said input terminals and including an output connection between them, a second pair of series-arranged impedances connected to said input terminals and having an output connection between them, a third pair of series-arranged impedances, normally in balance with said first pair, connected in parallel with said second pair and having a connection to the output terminal thereof from a point intermediate the impedances of said third pair, one of the impedances of said third pair being variable when stressed; a source of carrier frequency voltage; means for applying to said input terminals carrier frequency voltage derived from said source; and means for altering the relative values of the impedances in said second pair to produce a carrier voltage of desired and uniform amplitude across said output connections in the absence of applied stress to said variable impedance.

15. In combination, an alternating current bridge circuit having a pair of input terminals, a pair of series-arranged impedances connected to said input terminals and including an output connection between them, a second pair of series-arranged impedances connected to said input terminals and having an output connection between them, a third pair of series-arranged impedances, normally in balance with said first pair, connected in parallel by relatively long leads with said second pair and having a relative long lead connection to the output terminal thereof from a point intermediate the impedances of said third pair, one of the impedances of said third pair being variable when stressed; a source of carrier frequency voltage, means for applying to said input terminals carrier frequency voltage derived from said source; and means for compensating for any unbalance of said bridge circuit attributable to spray capacities between said relatively long connecting leads.

ELMER P. WHEATON.
RALPH H. OSTERGREN.

Certificate of Correction

Patent No. 2,393,669. January 29, 1946.

ELMER P. WHEATON ET AL.

It is hereby certified that errors appear in the printed specification of the above numbered patent requiring correction as follows: Page 3, second column, line 57, for "strap" read *stray*; page 6, second column, line 21, claim 15, for "spray" read *stray*; and that the said Letters Patent should be read with these corrections therein that the same may conform to the record of the case in the Patent Office.

Signed and sealed this 13th day of August, A. D. 1946.

[SEAL]

LESLIE FRAZER,
*First Assistant Commissioner of Patents.*